United States Patent [19]
Langer et al.

[11] Patent Number: 6,155,331
[45] Date of Patent: Dec. 5, 2000

[54] METHOD FOR USE IN CASTING TECHNOLOGY

[75] Inventors: Hans Langer, Grafelfing; Christian Wilkening, DieBen; Peter Keller, Keplerweg 7/Martinsried; Florian Wendt, Leipzig, all of Germany

[73] Assignee: EOS GmbH Electro Optical Systems, Planegg, Germany

[21] Appl. No.: 08/571,838

[22] PCT Filed: May 24, 1995

[86] PCT No.: PCT/EP95/01994

§ 371 Date: May 17, 1996

§ 102(e) Date: May 17, 1996

[87] PCT Pub. No.: WO95/32824

PCT Pub. Date: Dec. 7, 1995

[30] Foreign Application Priority Data

| May 27, 1994 | [DE] | Germany | 44 18 466 |
| Nov. 11, 1994 | [DE] | Germany | 44 40 397 |

[51] Int. Cl.[7] ............... B22C 1/22; B22C 9/02
[52] U.S. Cl. ............ 164/456; 164/4.1; 164/15
[58] Field of Search .................. 164/6, 12, 15, 164/147.1, 4.1, 456

[56] References Cited

U.S. PATENT DOCUMENTS

| 4,247,508 | 1/1981 | Householder | 264/219 |
|---|---|---|---|
| 4,618,924 | 10/1986 | Hinds | 364/191 |
| 4,641,270 | 2/1987 | Lalloz et al. | 364/474 |
| 4,752,352 | 6/1988 | Feygin | 156/630 |
| 4,844,144 | 7/1989 | Murphy et al. | 164/35 |
| 4,863,538 | 9/1989 | Deckard | 156/62.2 |
| 4,944,817 | 7/1990 | Bourell et al. | 156/62.2 |
| 5,017,753 | 5/1991 | Deckard | 219/121.63 |
| 5,053,090 | 10/1991 | Beaman et al. | 156/62.2 |
| 5,076,869 | 12/1991 | Bourell et al. | 156/62.2 |
| 5,132,143 | 7/1992 | Deckard | 427/197 |
| 5,147,587 | 9/1992 | Marcus et al. | 264/22 |
| 5,155,324 | 10/1992 | Deckard et al. | 219/121.63 |
| 5,156,697 | 10/1992 | Bourell et al. | 156/62.2 |
| 5,296,062 | 3/1994 | Bourell et al. | 156/62.2 |
| 5,658,412 | 8/1997 | Retallick et al. | 156/272.8 |
| 5,687,788 | 11/1997 | Caldarise et al. | 164/4.1 X |

FOREIGN PATENT DOCUMENTS

| 0 393 676 | 10/1990 | European Pat. Off. . | |
|---|---|---|---|
| 0 416 852 A2 | 3/1991 | European Pat. Off. . | |
| 2 678 532 | 8/1993 | France . | |
| 27 50 067A1 | 5/1978 | Germany . | |
| 3109076A1 | 3/1982 | Germany . | |
| 288993 | 4/1991 | Germany | 164/6 |
| 40 28 031A1 | 3/1992 | Germany . | |
| 42 04 422A1 | 8/1993 | Germany . | |
| 4309524C1 | 11/1993 | Germany . | |
| 4305201C1 | 4/1994 | Germany . | |
| 4300478C1 | 8/1994 | Germany . | |
| 4410046C1 | 5/1995 | Germany . | |
| 50-14218 | 5/1975 | Japan | 164/15 |
| 50-38054 | 12/1975 | Japan | 164/15 |
| 51-10813 | 4/1976 | Japan . | |
| 1-232027 | 9/1989 | Japan . | |
| WO88/02677 | 4/1988 | WIPO . | |
| WO 93/19019 | 9/1993 | WIPO . | |

OTHER PUBLICATIONS

Translation of Federal Patents Court Decision Mar. 16, 2000 Related to German Patent 44 40 397.

Rapid Prototyping Report, The Newsletter of the Desktop Manufacturing Industry, vol. 8, No. 4, Apr. 1998.

E–Mail correspondence of the ISATA Secretary in the oral proceedings of Mar. 16, 2000.

27th International Symposium on Automotive Technology and Automation Conference in Aachen,—Oct. 31–Nov. 4, 1994, pp. 1 to 3 and 185–191.

Japanese Casting Association Edition, "A hand book of casting (Imono Benran)", four times revised edition Maruzen, pp. 119–215, 145–195 (Jan. 20, 1986)—partial translation.

Partial Translation of Japanese Patent Publication 51–10813 Published Apr. 7, 1976.

Rompp Chemie Lexikon, Paperback Edition, Stuttgart, New York. Georg Thieme Verlag, Bd. 2 Cm–G, 1995, explanation of "Duroplaste".

A partial English translation of the underlined passage of Rompp Chemie Lexikon relating to "Duroplaste".

Brockhaus, Naturwissenschaften und Technik, Sonderausgabe, Mannheim 1989, Bd. 3, p. 267.

A partial English translation of the underlined passages of Brockhause, p. 267.

Metals Handbook, 9th edition, vol. 15 casting, p. 217.

Plastic Engineering Handbook of the Society of the Plastics Industry, Inc., 4th edition, pp. 451–452.

A concise Introduction to Ceramics, Van Nostrand Reinhold, New York, pp. 3–6.

Brockhaus, Naturwissenschaften und Technick, 1989, p. 259.

(List continued on next page.)

*Primary Examiner*—J. Reed Batten, Jr.
*Attorney, Agent, or Firm*—Dike, Bronstein, Roberts & Cushman LLP; George W. Neuner

[57] ABSTRACT

The geometry of the cast part is provided as a digital pattern and an inverse pattern for the lost casting mold including any core is generated from the digital pattern. A layer of a particulate molding material is provided. The molding material is made of a first material and a second material. The first material is chemically inert when irradiated by electromagnetic radiation. The second material is curable by a chemical curing process that is initiated by electromagnetic radiation. The layer is scanned by irradiating electromagnetic radiation on places of the layer corresponding to the inverse pattern for the lost casting mold including any core. The irradiation is controlled to initiate the chemical curing process in the second material. The layer providing, scanning and controlling steps are repeated for subsequent layers of the molding material to connect each layer to the immediately preceding layer by the irradiation to produce the lost casting mold including any core for subsequently casting the desired cast part.

42 Claims, 2 Drawing Sheets

OTHER PUBLICATIONS

Pressemitteilung von EOS GmbH Electro Optical Systems, May 1994.
Pressemitteilung von EOS GmbH Electro Optical Systems, Oct. 1994.
Modern Casting, Mar. 1993, p. 55.
3rd Int. Conf. on Rapid Prototyping at the University of Dayton, Conf. Proceedings, Dayton, Ohio, 1992, pp. 73–77.
Solid Freeform Fabrication Symposium Proceedings, University of Texas at Austin, Texas, 1991, pp. 195–204.
Flemming/Tilch: Formstoffe und Formvefahren, Deutscher Verlag für Grundstoffindustrie, Leipzig/Stuttgart, 1. Aufl. 1993, pp. 333–367, 105 et seq.
Meyers Lexikon der Technik und der exakten Wissenschaften, Bd. 2, Bibliographisches Institut AG, Mannheim 1970, pp. 1149 et seq.
Technische Rundschau 83 (1991) 20, pp. 36–43.
Technische Rundschau 83 (1991) 44, pp. 58–61.
Materials World, Dec. 1993, pp. 656–658.
Modern Casting, Oct. 1993, pp. 25–27.
Konstruieren und Giessen 17 (1992) 4, pp. 13–19.
Technische Rundschau 82 (1991) 11, pp. 40/41.
Automobil–Production, Aug. 1992, pp. 102/104.
Laser–Praxis, May 1992, pp. LS58/LS59.
Int. Journal of Powder Metallurgy 28 (1992) 4, pp. 369–381.
Metallurgical Transactions A, 24/1993, pp. 757–759.
Modern Casting, Aug. 1993, pp. 30, 31.
Plastic World, Feb. 1993, p. 23.
Solid Freeform Fabrication Symposium Proceeding. Univ. of Texas (1991) pp. 205–212.
Solid Freeform Fabrication Symposium Proceeding. Univ. of Texas (1991) pp. 44–53.
Solid Freeform Fabrication Symposium Proceeding. Univ. of Texas (1992) pp. 63–71.
Solid Freeform Fabrication Symposium Proceeding. Univ. of Texas (1992 pp. 124–130.
Solid Freeform Fabrication Symposium Proceeding. Univ. of Texas (1992) pp. 141–145.

METHOD FOR USE IN CASTING TECHNOLOGY

The invention relates to a method for the rapid production of dead molds and cores for the casting practice without using master molding tools.

There are conventional methods for the rapid production of three-dimensional, geometrically complex and exact objects even when provided with undercuts, and those methods operate without master molding tools, i.e. without the bodily existing outer and inter shape of the object as positive or negative mold and without machining and cutting operations and generating the desired objects directly from the three-dimensional representation of the geometry existing in the computer, whereby solid, powderous materials or liquid materials are used as base material. Those methods are known as generative manufacturing methods, rapid prototyping RP, solid freeform manufacturing SFM or fast free form fabrication FFFF (Technische Rundschau 83 (1991) 20, pp. 36–43 and 44, pp. 58–61, Materials World, December 1993, pp. 656–658, (modern casting October 1993, pp. 25–27). The best known method of this kind is called stereo lithography (Konstruieren+Gieβen 17 (1992) 4, pp. 13–19, Technische Rundschau 82 (1991) 11, pp. 40/41, Automobil-Produktion August 1992, pp. 102/104, Laser-Praxis May 1992, pp. LS58/LS59).

These methods allow to produce prototypes, sample parts etc. of various resins, coated paper as well as wax. Various materials are suitable for use with objects produced therefrom as lost molds in fine casting processes so that consequently cast parts can be produced by fine casting without using a master molding tool. It is further known that metallic or ceramic objects can be directly produced without master molding tools by the selective laser sintering SLS method (Int. J. of Powder Metallurgy 28 (1992) 4, pp. 369–381, Metallurgical Transactions A 24/1993, pp. 757–759).

A method known as selective laser sintering is disclosed in DE 43 00 478 C1. Using this method three-dimensional objects can be produced by successive solidification of individual layers of the object to be formed of powdery solidifiable material under the influence of laser radiation on each layer at the places corresponding to the object. It is known to produce three-dimensional objects by laser sintering of metal or ceramic powder.

The powders used in the selective laser sintering method are of ceramic type consisting of two components A and B and the bonding between the particles is made by ceramic bonding, i.e. a chemical reaction between the components of the powder.

It is known to use alumina in connection with ammonia dihydrogen phosphate or fluorophosphateglass powder as bonding substance, whereby the used one of the latter two substances is molten into a glass phase by laser irradiation, the granulated alumina is infiltrated and the bonding having a defined green strength is obtained by congelation. Thereafter the obtained body is exposed to a temperature of above 800 degrees Celsius for several hours outside of the selective laser sintering plant, whereby both components finally react to produce a ceramic bonding having high density, strength, hardness and melting temperature (baking or firing process). The two components can be mixed (FIG. 1) or one component is coated by the other component (FIG. 2); in any case a ceramically bonded body is obtained after the baking process. It is a typical characteristic of all so far known embodiments of this process that the component A which does not melt initially in the selective laser sintering device is incorporated into the chemical reaction occurring in the baking process which results in the ceramic body C. A further typical characteristic are the high temperatures and long baking periods necessary and the proposed use of the generated ceramic body as a molding shell or core for the fine casting process. Also when using other materials a uniform ceramic part is produced.

(3rd Int. Conf. on Rapid Prototyping at the University of Dayton, Conf. Proceedings, Dayton, Ohio., 1992, pp. 73–77; Solid Freeform Fabrication Symposium Proceedings, University of Texas at Austin, Tex., 1991, pp. 195–205, 205–212, and 1992, pp. 44–53, 63–71, 124–130, 141–146; U.S. Pat. Nos. 5,156,697, 5,147,587, 4,944,817, European Patent Application No. 0,416,852 A2).

The most common application of the selective laser sintering method, namely the sintering of resin powders by surface melting and baking of the particles, shall not be explained in detail, because the objects produced thereby can not be applied directly, i.e. as lost molds or cores, in a sand casting method. Moreover, the known treatment of wax powders is not discussed, because the objects produced thereby are suitable only for use as lost molds (positives) in fine casting methods.

(U.S. Pat. Nos. 5,155,324, 5,053,090, 5,076,869, 5,132, 143, 5,017,753, 4,863,538, International Patent Application PCT/US87/02635 (Internat. Publ. No. WO88/02677)).

In the case of sintered metallic powders the metallic particles are coated (FIG. 2) or mixed (FIG. 1) with polymeric binders such as epoxy resins so that the provisional bonding for obtaining the green strength of the objects is made by this polymeric binder. During the irradiation of the material in the selective laser sintering device the solidification is only by superficial melting of the polymer, infiltration of the metal/ceramic particles and subsequent pasting of the particles when cooling (FIG. 4). No chemical reaction takes place. Thereafter and outside of the selective laser sintering device the polymeric binder is expelled by heat treatment, whereby the metallic particles sinter together at considerably higher temperatures (FIG. 5). Thereupon the body which is still porous can be infiltrated by low melting secondary metal D in order to obtain the final density and strength. The same principal method is also described for ceramic powders.

(Solid Freeform Fabrication Symposium Proceedings, University of Texas at Austin, as above).

Further, intermetallic bonds are described (as above) which require more powerful lasers and therefore a higher input power for their production. The use of thus produced metallic and ceramic parts as lost molds and cores in sand casting is not possible.

It is further known that ceramic molds for the fine casting methods can also be produced according to the so-called direct shell production casting by selective solidification of ceramic powders by means of a silicate binder extruded from a movable nozzle (modern casting March 1993, pp. 55 and August 1993, pp. 30/31, Plastics World February 1993, p. 23). This is a chemical reaction with the result of a ceramic bond which is made selective by only at the desired places adding the binder component B to the basic component A which is applied on the entire surface. Again, it is not possible to produce lost cores and molds for the sand casting method in this manner.

It is further known to use fusable particles which can be applied layerwise, in analogy to the selective laser sintering process, fused in each layer corresponding to the contour of the part to be produced by using a laser and by sintering form the part to be produced. The fusable particles may consist of resin, resin-coated sand or fusable sand particles. In the latter case the laser must be powerful enough to melt sand. It is not known that correspondingly produced objects can be used as lost molds and cores in sand casting metals (U.S. Pat. No. 4,247,508).

It is unknown to produce lost molds and cores suitable for casting processes out of materials other than ceramic materials by means of generative manufacturing methods without using master molds. Hence, the casting application of all such molds and cores produced without use of master molding tools is limited to fine casting and no rapid molding method operating without master molding tools (molds and core boxes) is available for the widely used sand casting method.

It is known that warm or hot curing molding substances can be used for producing cores and molds for the casting industry, whereby the produced cores and molds can be casted using nearly all known casting materials. These molding substances consist of a molding base substance that is chemically inert first material and a second material that is curable by a chemical process occurring within the material under the action of electromagnetic radiation. Examples of the first material include materials such as silica sand, zirconic sand, olivine sand, chromite sand, chamotte, corundum, carbon sand, silica material or any other mineral material, pure or mixed in any proportion with one or a plurality of other materials, either granular, granulated or comminuted, or partly or completely of already used, regenerated or non-regenerated molding material, whereby adhering materials may chemically react with the second material. Examples of the second material include materials consisting of phenolic resins, furane resins, urea resins or amino resins, novolakes or resoles, urea formaldehydes resins, furfur alcohol urea formaldehyde resins, phenolic modified furane resins, phenolic formaldehyde resins, furfur alcohol phenolic formaldehyde resins, acrylic modified phenolic resins or any other resin which can be thermally initiated, either liquid, solid, granulated or powdery, and may be modified and/or dissolved. In preferred embodiments, during the process of mixing the first material with the second material or of coating the first material with the second material one or several aggregates such as accelerators, acids, iron oxide, separating agents, ammonium salts, hexamethylentetramine, hexamine, urea, magnetite, hematite, calcium stearate, glycerine, water or solvents are added. However, so far these molding substances can only be processed using master molding tools such as model devices and core boxes which are entirely made of metal (Flemming/Tilch: Formstoffe und Formverfahren, Dt. Verl. f. Grundstoffind. Leipzig/Stuttgart, 1st Edition 1993, pp. 333–367, see also p. 105 et seq.).

Disregarding exceptions of applications with downward tendency (core baking process, see above pp. 333–338) this is a process with chemically curing binder systems, whereby the chemical curing reaction is initiated and driven by external heat supply. The mold base substance A which does not participate in the curing reaction and is chemically inert may be mixed (FIG. 1) or coated (FIG. 2) with the chemically reacting binder B.

All substances used in the casting practice as molding material are suitable, namely silica sand (in mineral form as low quartz, high quartz, cristobalite or tridymite or as amorphous quartz), zirconic sand, olivine sand, chromite sand or carbon sand, chamotte or corundum. The mold base substance may be powdery, granular or granulated and may consist of round, irregularly formed or cracked particles. Further, the substance may be new or obtained from used mold material by regeneration or simple re-use. It may have a very narrow or wide grain size distribution, i.e. its grain characteristics correspond to a synthetic single grain sand or a mixture of various corn sizes as existing in natural deposits. It is possible to mix several of the above-mentioned substances to a mold base substance.

Various organic binders are used as binders for the warm or hot curing methods. Suitable are phenolic resins (novolakes or resoles), furane resins, urea resins, amino resins, urea formaldehyde resins, furfur alcohol-urea formaldehyde resins, phenolic modified furane resins, phenole formaldehyde resins or furfur alcohol phenole formaldehyde resins. Curing by heat supply is also possible for molding substance systems comprising epoxy resin binders and acrylic resin binders; however, for reasons of productivity these binders are presently processed mostly by gas curing (sulfur dioxide). The selection of the binder thereby depends from the characteristics of the casting material and the cast part as well as from the quality, process, price and productivity requirements. Subject to these requirements one or more admixtures such as accelerators, acids, iron oxide, separating agents, ammonium salts, hexamethylentetramine, hexamine, urea, magnetite, hematite, calcium stearate, glycerine, water or solvents, may be necessary when required by the particular application. Depending on the processing method and the available instrumentation as well as on the particular application the binder may be liquid, solid, granular or powdery, modified and/or dissolved before the coating or mixing process.

The curing process and therefore solidification of the molding materials consisting of the molding base substance and the binder system is made by chemical reaction of the binder system. The molding base substance (with a portion of about 85–99 mass % of the entire molding material) does not participate in this chemical reaction. The underlying curing reaction is the polycondensation by external heat supply of the resins which are precondensed to different degrees whereby highly three-dimensional cross-linked makro molecules are formed which give the cohesive strength of the now solidified molding material including the molding base substance component A. This polycondensation reaction is irreversible and the binder component E (FIG. 7) thus obtained has characteristics which chemically differ from those of the original form B (FIG. 1 and FIG. 2), whereas; the mold base substance component A did not participate in the reaction and is unaltered.

One of the best known hot curing forming processes for use in the casting practice is the shell mold casting process according to Croning, as described in Meyers Lexikon Technik und exakte Naturwissenschaften, vol. 2, Bibliographisches Institut Ag, Mannheim 1970, p. 1150 et seq., which serves to produce molds and cores, whereby resin-coated, dry and pourable molding substances are cured on or in a heated master molding tool.

In this process shell-shaped molds having an essentially uniform thickness, so-called shells, are produced, with the aid of modeling devices, and respective two such shells are combined to a casting mold for the casting. The model parts made of metal and mounted on a so-called model plate of metal are preheated through the plate up to 200 to 400° C. and the dry pourable mold substance (consisting of mold base substance coated with the binder system) is poured onto the model plate. After the start and progress of the above described chemical curing reaction (polycondensation to a defined degree of cross-linking) in the molding material effected by the heat supplied from the model plate and introduced into the bulk of molding substance up to a defined depth which is proportional to the time available for the heat conduction, the surplus mold material is poured off and the remaining layer of molding material (the shell) is finally cured under additional heat supply to the back side (for example by means of gas burners), whereupon the shell half is removed from the model device. According to the same principle (hollow) shell cores may be produced whereby the heat input is from the core box through the outer contour and the uncured molding material remaining in the interior is poured out. Subsequently the two shell halves as well as additional cores, if necessary, are combined to the casting mold, if desired pasted or clamped together and/or back-filled and are ready for casting. During the casting process the resin is burnt and thereafter the sand may be easily removed from the cast part.

A further known sand casting process is the flask mold process described in the above-mentioned document.

Usually the molds for complex sand casting parts consist of two shell mold halves and multipart mold boxes having one or several cores placed therein. Each one of those components of the mold must have a simple shape so that it may be formed out (removed) from its core box or lifted off from its model plate after its production. This compulsion to simplification increases the number of cores required. For the production of complex cast parts, for example cylinder heads for motors, between five and twenty single cores are required which are either individually placed into the two mold boxes or previously combined to a core pack.

The known process has the following disadvantages:

1. At least one two-piece core box must be produced for each core, which is extremely time and labor consuming in particular at the prototype stage. A heatable model plate is required for the shell molds.

2. Each joint between the cores or between the shell mold and the core has tolerances so that the overall precision of the arrangement is not sufficient for the production of precision cast parts.

3. The constructional design of the joints or core supports for defining the position of each core forms an additional expense.

The chemical reaction taking place in the shell mold casting process will be explained in more detail for the example of the group of warm or hot curing mold material; modifications of the general basic principle described below may occur for other binder systems.

Phenolic resins which are mostly of the novolak type are used as binders for shell mold materials. They do already possess a high fraction of cross-linked molecules; the cross-linking process which was started when producing the resin and resin-coating the mold base substance was broken off at an early stage. When coating the mold material hexamethylentetramine was admixed which is a carrier of formaldehyde and releases the same under the influence of heat. This formaldehyde causes the further curing and cross-linking of the resin under the influence of heat. The resin irreversibly transforms from the original A-resol-state (fusible) through the B-resitol-state (plastic) into the C-resit-state (hardened, not fusible) whereby the last mentioned state is not completely obtained. About 10 to 15% of the resin binder remain in the states A-resol and B-resitol and cause a certain residual plasticity of the molded part which allows a problem-free processing of the mold part in casting practice (for example dressing is still possible immediately after removing the part from the master molding tool). The reaction has, however, proceeded far enough to largely attain the irreversible cured state and the corresponding high strength. Generally a heat treatment is not necessary any more. If such heat treatment is nevertheless carried out (for a few minutes with temperatures between 150 and 250° C.), for example to remove the last bits of gaseous reaction products and water vapor from the mold parts and to thereby avoid gas defects in delicate cast parts, then such an influence of heat does not loosen a reversible bonding connection between the mold substance particles to thereby destroy the mold part, but enhances the strength by an even more complete curing in the irreversible C-resit-state.

The heat energy required for the curing of the mold substance binders concerned is thereby entered into the mold material through the master molding tool (a model when producing an outer mold; a core box when producing a core) heated up to a temperature of about 200–400 degrees Celsius (dependent on the type of binder and the geometry of the mold part). This heat entry occurs by heat conduction from outside into the depth of the mold material. Due to the relatively low heat conductivity of most mold basic substances this heat conduction is a time consuming process which influences the productivity of the process on the one hand and the convenient adjustment of the characteristics of the mold material on the other hand. So a defined residence time within the master molding tool is necessary to allow the heat to be conducted into the volume of the mold part; during this time period the outer shell of the mold part which is directly adjacent to the heat emitting core box and thereby exposed to the highest heating effect must not burn. The reactivity of the mold material must be adjusted correspondingly which always means a compromise between the properties of the mold material and the process parameters. Caused by the above-mentioned temperatures of the master molding tool and the heating thereof e.g. by means of a direct gas flame only tools made entirely of metal (mostly high-tensile steels) are possible.

Because of the good properties of the cast parts, such as high dimensional accuracy, constant quality and good surface quality, to be obtained with warm or hot curing mold materials these materials are widely used amongst the processes for producing molds and cores for superior cast parts of high quality, in particular when producing cast parts for the automotive industry, the construction of vehicles, the hydraulic industry and the mechanical engineering. This refers to aluminum and cast iron alloys as well as to steel casting. However, all foundries working with those mold materials are faced with the problem that component parts, prototypes, small series, samples etc. ordered by a customer can only be produced at high costs and time expense, because in every individual case a master molding tool (model and/or core box) consisting entirely of metal must be produced. Cheaper methods of model construction (wood or epilox models) are dropped because of the hot processing of those mold materials, and a manufacture of the sample parts with other mold materials in cheaper modeling devices would no longer allow a comparison between those sample parts and the later industrial scale manufacture with hot curing mold materials as far as quality parameters of the produced cast parts are concerned. Thus, the costs and preparatory times connected with full metal tools put the foundries working with warm and hot curing mold materials at a strong disadvantage against other mold processes of competitors; moreover, they also cause high costs and loss of time within the foundry in the phase of the technological preparation of the industrial scale manufacture whenever several test castings with modified geometries of the casting and feeder system or of the dimensions of the cast parts are required.

It is not appropriate to apply the above-described known methods of rapid mold and core manufacture in fine casting processes to sand castings for technological reasons. In fact, the cast parts designed for sand casting (irrespective of the casting material) are completely different cast parts as regards size, mass, geometry, complexity (inner contours and therefore core requirements), required dimensional accuracy, surface quality and price. The sample parts/ prototypes manufactured by fine casting methods would have no relation to the later industrial scale manufacture with sand casting and therefore do not serve either to the client (for testing of sample motors etc.) or to the foundry (for the technological preparation of the later industrial scale manufacture). Models manufactured by other methods of rapid prototyping, such as stereolithography, selective laser sintering of resins, laminated object manufacturing of coated paper are not applicable to warm or hot curing molding processes because of their low temperature resistance and low heat conductivity. There are no further alternatives without the conventional pattern manufacture. It is for this reason that in every foundry in question all pilot tests, sample manufactures etc. are made with the metal patterns corresponding to the later industrial scale manufacture, and the drawbacks regarding costs (of several thousand DM for a simple core box up to e.g. DM 100,000.—for the tool for producing crank shafts) and time required for producing the master molding tool (ca. 3 weeks for a simple core box up to ca. 12–16 weeks for complex tools e.g. for a cylinder crank case) have to be accepted. In view of increasingly short model cycles and development periods in particular the competitiveness of the casting manufacturing method compared to competing processes is worsened.

It is therefore the object of the claimed invention to provide a molding method for foundries working, with sand casting technology with warm and hot curing mold materials, whereby the molding method corresponds technologically to the industrial scale manufacture, but does not require expensive and time-consuming pattern construction, i.e. master molding tools, and this molding method is adapted for producing sand molds and cores for casting individual parts, prototypes and sample parts and also for technological development work within the foundry itself. At the same time the assortment profile of those foundries is enlarged from a manufacture of middle-size, large-size and very large-size series, as presently usual, to batch sizes of individual pieces and job-size manufacture, and additional market segments for those high quality cast parts can be opened up. This possibility stands for a drastic acceleration of the development process in the phase of product development, testing, constructional modification and further development in the branches of industry using such cast parts (e.g. automotive industry).

It is the object of the invention to find suitably combinable developments amongst 1.) the newly developed, only recently available methods of rapid prototyping and 2. the conventional and practically proved casting mold materials and to provide a method of manufacturing cast parts of warm curing mold materials whereby a casting mold of any complexity can be produced in a rapid and cost-saving manner.

It is the advantage of the process that casting molds of any complexity can be produced without having to previously make pattern parts and core molds. The method is particularly suitable for applications whereby small piece numbers of complex components are required at short notice, as for example when building prototypes in motor development. The construction of core molds and pattern plates with tool construction, the assembly of the cores and the work required for dividing the overall core into conventionally produceable part cores is entirely dropped. In summary a considerable time is saved and at the same time the accuracy of the overall mold is increased.

Further features and advantages of the invention will result from the description of embodiments with reference to the figures. In the figures:

FIG. 1 and FIG. 2 show the mold material system consisting of mold base substance A such as silica sand, zirconic sand, olivine sand, chromite sand, chamotte, corundum, carbon sand, silica material or any other mineral material, pure or mixed in any proportion with one or a plurality of other materials, either granular, granulated or comminuted, or partly or completely of already used, regenerated or non-regenerated molding material, mixed (FIG. 1) or coated (FIG. 2) with the binder system such as phenolic resins, furane resins, urea resins or amino resins, novolakes or resoles, urea formaldehydes resins, furfur alcohol urea formaldehyde resins, phenolic modified furane resins, phenolic formaldehyde resins, furfur alcohol phenolic formaldehyde resins, acrylic modified phenolic resins or any other resin which can be thermally initiated, either liquid, solid, granulated or powdery, and may be modified and/or dissolved.

FIG. 3 shows the composite produced when systems according to FIG. 1 or FIG. 2 are processed by selective laser sintering and subsequent firing and, as known from the patent documentation, the component A participates in the chemical reaction (e.g. manufacture of ceramic shells and cores for fine casting).

FIG. 4 shows the preliminary stage of the composite according to FIG. 3 before the firing process. The coherence is obtained merely by sintering (fusing, infiltration, cooling, baking) of the component B without chemical reaction. This composite may also come into existence as intermediate stage (which is not intended as final product and not claimed) of the claimed invention (the binder component B remains in the A-resol-state or in the B-resitol-state, does not irreversibly cure to C-resit).

Figure 7:
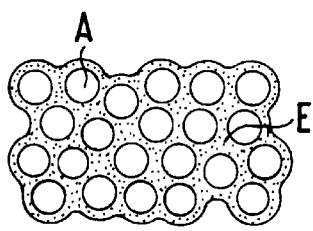

FIG. 7 shows the final stage of the process according to the invention and claimed hereby, whereby an irreversible chemical reaction cures the resin binder component B (to generate state E) and mold base substance component A does not participate therein. A and B are conventional casting materials and E or the entire composite, resp., therefore forms an end product which is known from so far conventionally processing this mold material system and has been proved qualified for casting.

Figure 8:
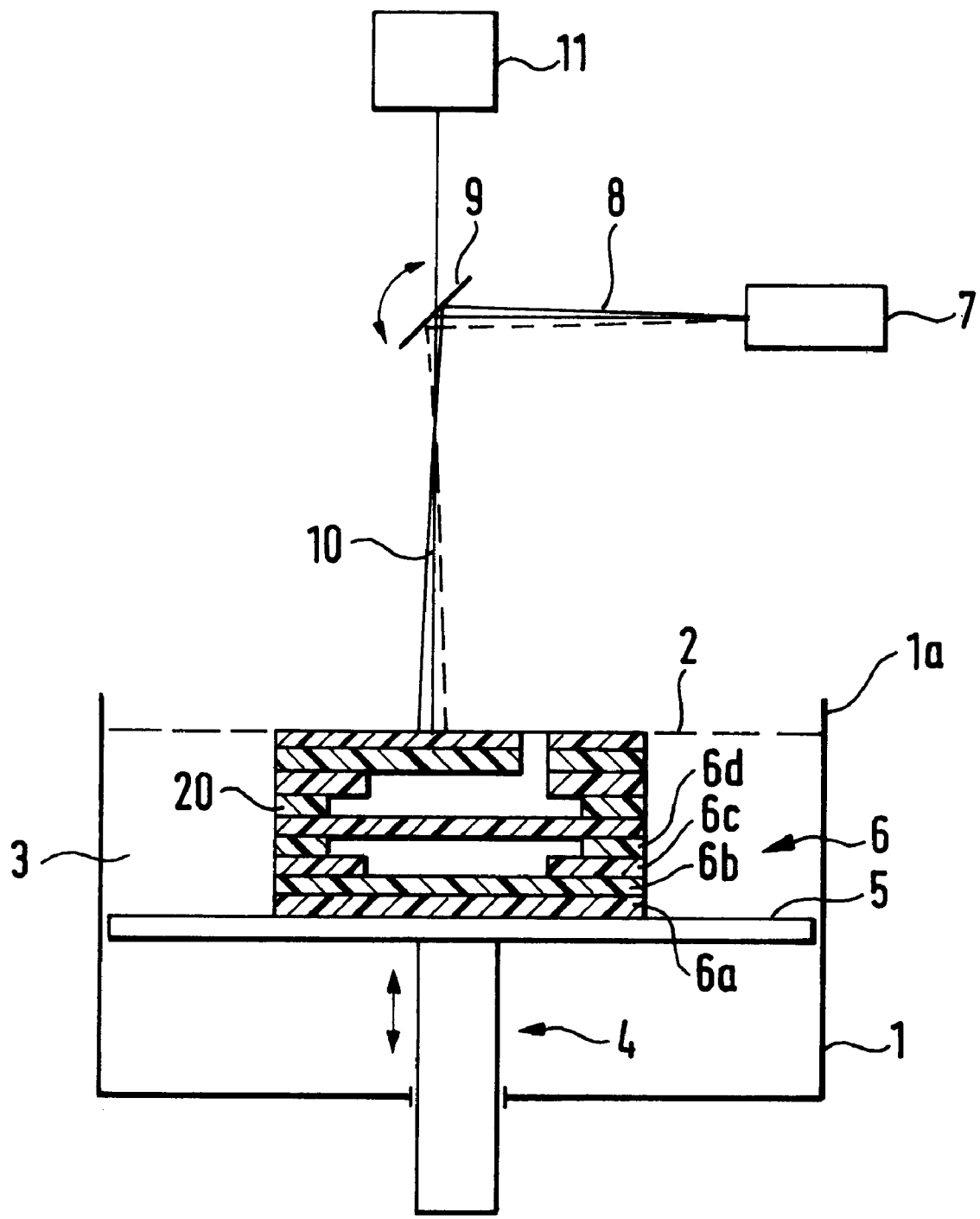

FIG. 8 is a schematic section through an apparatus for carrying out the inventive method.

As shown in FIG. 8, the apparatus for carrying out the method comprises a container 1 being open at its top and having an upper edge 1a. Within the container 1 there is a support 4 with a substantially plane and horizontal support plate 5 which is arranged parallel to the upper edge 1a and may be displaced and positioned upwards and downwards in vertical direction by means of a not shown elevation adjustment device.

A not shown device for applying a layer of curable molding material 3 onto the support plate 5 and for smoothening the surface 2 of the applied layer of the molding material 3 is arranged above the container 1.

The casting mold 6 to be formed is arranged on the support plate 5 and is built up by a plurality of respective layers 6a, 6b, 6c, 6d of cured molding material, whereby each layer extends parallel to the support plate 5.

An irradiation device 7 in the form of an infrared laser delivering a directed light beam 8 is arranged above the container 1. The directed laser beam 8 is deflected by a deflection device 9, for example a rotating mirror, onto the surface 2 of the molding material 3 within the container 1 as deflected beam 10. A control unit 11 controls the deflection device 9 so as to direct the deflected beam 10 onto any desired point of the surface 2 of the molding material 3 within the container 1. The control unit 11 is connected with a computer which delivers the corresponding data for solidifying the layers (6a, 6b, 6c, 6d) of the casting mold 6 to the control unit 11.

The method for producing the casting mold 6 is as follows: initially the geometry of the desired object (the mold or the core) is processed in the computer by means of a 3D-CAD system. Conveniently, the starting point is the construction of a cast part to be produced which is already often provided in digital form by the client.

Thereafter the data of the casting mold 6 to be produced are generated from the produced CAD pattern data by inverting in the computer. Those data obtained by inverting represent a negative of the desired cast part. The cavities of the later cast part, the so-called cores, are also taken into consideration when forming the negative and may thereafter be produced as integrated cores together with the mold shell when producing the casting mold.

In the CAD model of the casting mold to be produced further apertures are provided within the object to be formed in addition to the apertures required by the casting technology in order to facilitate the later removal or pouring-out of the unsolidified material. Those apertures are provided at those places which are best suited for removing the material.

As an example the manufacture of a crank shaft for a combustion engine (passenger vehicle, motor cycle) shall be considered. The amount of shrinkage according to the casting material to be used is added to the construction of the raw cast part in the CAD system. Thereafter the modifications of the geometry required by the casting technology are made, for example the addition of feeders and of the complete gate system, until the geometry of the entire configuration comprising cast part and casting system is perfectly described. If the mold to be produced shall be later completed with further prefabricated or purchased parts (e.g. base plate, runner gate, exothermal feed cap, uncontoured outer parts of the mold etc.; but also cores, chill forms, if desired), those parts have to be left open at this point. The final constructed geometry is then inverted in the CAD system in order to obtain the geometry of the mold or the core to be produced (of the negative of the cast part to be produced or a part thereof corresponding to the outer or inner contour). As no model pattern has to be drawn, lifting slopes are superfluous, whereby the cast parts to be produced are closer to final dimensions and later machining processes at the cast part may be omitted. Further, the vent channels required for discharging the gaseous reaction products generated by decomposition of the molding substance binder may be constructionally provided in the mold part. In certain cases an undivided mold may be produced, if the unsolidified, pourable molding material can leave the final mold through larger openings which are later closed, e.g. by prefabricated base plates or purchased runner gates. Thus, tolerances and play of and between the form halves may drop and the cast part can be produced in closer geometrical tolerances. This one-piece and therefore substantially more accurate production will be normally used for cores, even if very complex, which must conventionally be produced in many single parts to be assembled because of the required removability from their tool.

Figure 1:
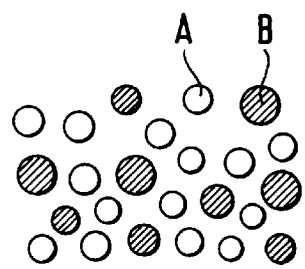
Figure 2:
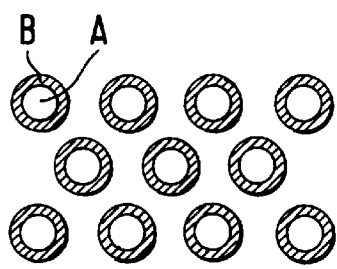
Figure 3:
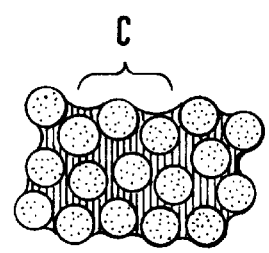
Figure 4:
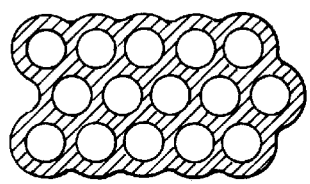
Figure 5:
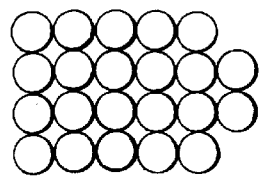
FIG. 5 shows the sintered composite generated from particles of component A after firing and expelling component B in the furnace. Intermediate stage of the so-called secondary metal process known in the literature.
Figure 6:
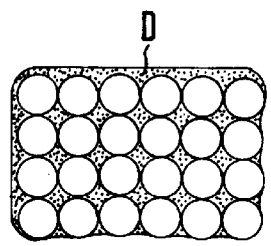
FIG. 6 shows the final stage of this known secondary metal process after infiltration of low melting metal into the sintered composite.

This geometry of the object or the casting mold 6 to be produced is thereafter decomposed in the computer into layers having a thickness which is adjusted to the grain size of the molding material to be used (e.g. twice the average grain size) and transferred to the sintering machine. The molding material is filled into this sintering machine. The working room may be uniformly heated to a temperature a few degrees below the softening temperature or the beginning of the softening interval of the molding material binder by radiation action caused by a laser beam. However, a molding material with room temperature may normally also be used. A layer of molding material corresponding to the adjusted layer thickness is thereafter selectively scanned with the laser through a movable mirror system according to the requirements of the geometry of the cross-section through the mold/the core associated to the respective elevation coordinate, whereby a sufficient temperature is obtained in the irradiated particles of molding material and the binder component (B in FIG. 1 and FIG. 2, of the molding material is cured.

In this method the support plate 5 is first positioned within the container 1 so that a distance corresponding exactly to the intended layer thickness exists between this upper side of the support plate 5 and the surface 2 of the molding material 3 within the container 1. Thereupon a layer of the molding material 3 is applied to the support plate 5. The layer of the molding material 3 on the support plate 5 is irradiated at predetermined places corresponding to the casting mold 6 by means of the laser beam 8, 10 generated by the irradiation device 7 and controlled through the deflection device 9 and the control unit 11, whereby the molding material 3 cures and forms a solid layer 6a corresponding to the casting mold. The formation of further layers 6b, 6c, 6d is successively made by lowering the support plate 5 by an amount corresponding to the respective layer thickness, applying molding material for each new layer and again irradiating at the places corresponding to the casting mold 6. The layers have a thickness of 0.1 mm to 0.2 mm. The molding sand of a corresponding layer which is not hit by the laser beam is not solidified and serves to support the layers thereabove. The unsolidified molding sand can be reused afterwards.

When irradiating care should be taken that an amount of energy sufficient for initiating the chemical curing reaction (polycondensation, s.a.) is entered into the molding material to be cured; otherwise the particles of molding material are only reversibly pasted together by superficial sintering which causes destruction of the cast part under later heat action (e.g. at an external post-curing process in a furnace, but certainly at the second cast) by decomposition of the sintered composite. Such cast parts produced without the proper chemical curing mechanism can not be used in casting.

If for example the above explained shell molding materials on the basis of phenolic resin are irradiated and reacted by means of a laser in the here described process, the energy input necessary for an irreversible curing can be determined by observing the color change of the molding material.

Required is a dark yellow to ochreous/light brown color of the molding material after the irradiation. If the molding material remains light yellow, then the B-resitol-state and the C-resit-state are not reached, the particles are only pasted together and the composite can easily be decomposed under the influence of heat by remelting the resin remained in the A-resol-state. A dark brown color turning into black characterizes a burnt resin binder which is also exempt of binder force. Dark ocher to medium brown indicates a maximum strength (complete curing), but those parts may prove as being too brittle for the handling processes necessary up to the second casting.

Thus, by correctly choosing the energy input an irreversible chemical reaction of the binder is initiated and a rigid, stable connection between the irradiated particles of molding material and the contacting neighbors is generated. After irradiating one layer the next layer of molding material is applied and irradiated etc. until the body is finished. At unexposed places the unsolidified molding material remains as a support for the next applied layer of molding material to be cured so that undercuts can be produced.

Contrary to the known conventional processing by means of master molding tools the energy input necessary for the chemical reaction of the warm or hot curing casting molding materials is not made by simultaneous transfer of the energy stored in the heated master molding tool to the molding material within the tool and distribution in the molding material by means of heat conduction, but the energy required for curing the respective irradiated particle of molding material is directly transferred to the particle by the controlled laser beam, absorbed and used for initiating the chemical reaction of the binder without requiring heat conduction processes. This pointed selective energy input and the exact control of the laser beam allows the production of even extremely complex cast parts without requiring the previous bodily existence of an image of its geometry (as positive or negative) in the form of a model, pattern or the like; prerequisite for the production of the mold parts is only the geometrical representation as data set within the computer and the amorphous pourable molding material which chemically cures under the influence of heat according to the here described reaction mechanism.

The finished casting mold is removed from the surrounding loose sand bed after termination of the building process. The unsolidified molding sand in the interior of the mold is sucked off, poured out or blown out through the runner gate opening and/or through openings in the mold 6 specially provided for removing the unsolidified sand. At the later casting process casting material flows into these openings and is cut off or removed, resp., after cooling.

The finished casting mold may be aftertreated, for example by thermal post-curing, for improving the surface quality. The surface quality of the mold/the core can be improved by manual post-treatment and applying of coating layers and the strength can be increased by a thermal aftertreatment. This aftertreatment may consist in post-curing the mold part with hot air in a furnace (at about 150 to 250 degrees Celsius for a few minutes, dependent on the size) or by means of microwaves. It is thereby achieved that the irreversible chemical reaction causing the mold material to cure proceeds as completely as possible and the molding material is cured to the possible final strength. This means for the phenolic resin shell molding material that the overwhelming majority of the binder is cured into the C-resit-state and only the portions necessary for the plasticity remain in the B-resitol-state.

With particularly thick-walled mold parts problems may occur in that a high energy input is required for curing the parts as completely as possible (if the use thereof requires a particularly high strength, for example in iron casting) and the energy input is for example achieved by multiple irradiation of each layer or by a particularly small distance of the scanning traces. In such a case the energy input may exceptionally be of an order of magnitude which causes a relevant heat conduction within the molding material even into parts thereof which are not intended for curing. This heat conducted into the depth of the parts causes solidifying reactions at undesired places and thereby "growing" of the mold part. This effect can be avoided if in the parts concerned the outer contour line of the cross-section of each layer is irradiated to a particularly high extent so that the binder selectively burns along this outer contour. Even with sufficient heat conduction beyond this contour no baking may occur, because the binder at the outer surface of the mold part has irretrievably lost its binding force.

After the aftertreatment processes, such as post-curing, dressing etc., the mold/core is ready for assembly/completing and casting. The mold of the crank shaft example is produced in two parts; dependent on the size both parts may also be produced simultaneously whereby a few millimeters of molding material which is not irradiated by the laser must be provided as separating layer. The mold halves may also be cranked if required by the offsets of the counter masses of the crank shaft (e.g. six-cylinder motor) and already contain the ingate, the cross-gate and the feed as parts of the casting system. After finishing the mold halves are dressed, provided with feed caps, combined, clamped together, provided with an ingate funnel pasted thereon, evenly placed, back-filled against breaking apart under the influence of the heat of the casting metal, clamped together or inserted into a casting frame or casting box, loaded, if necessary, and are ready for casting. With the mold parts produced according to the here described method all further techniques which are not described at this point, but are usual and known when casting into lost molds and/or with lost cores may be applied, those techniques including the aftertreatment of the mold parts, completing the mold parts with accessories necessary for casting, combining (e.g. to a core package), of inserting into casting boxes, mold receiving frames etc., and of casting itself, in analogy to usual processes for molds and cores produced in conventional manner from warm and hot curing mold materials.

Mold parts which are manufactured in this manner can particularly be used as cores or molds or parts thereof in sand casting and low pressure and gravity die-casting, but are not limited thereto. All known casting materials may be poured into so manufactured mold parts. In the case of casting materials having a low melting temperature, such as e.g. aluminum silicon alloys, a suitable modification of the phenolic resin binder will be selected in order to improve the decomposition of the molding material after casting in the same manner as it is done with the conventional manufacture of mold parts of shell mold material. In analogous manner several of the aggregates such as accelerators, acids, iron oxide, separating agents, ammonium salts, hexamethylentetramine, hexamine, urea, magnetite, hematite, calcium stearate, glycerine, water or solvents, will be added to steel casting alloys when processing the molding material (e.g. magnetite) in order to avoid burning. It will further be advantageous in many cases to carry out a congealing simulation calculation for designing the casting and feeding system, because very few empirical casting data will naturally be available for the prototype cast parts to be manufactured. The computational prerequisites required for such simulation calculations are already given by the necessary 3D-CAD construction. The knowledge regarding the best casting and feeding techniques gained thereby may then be applied already to the manufacture of the first cast part, thereby again saving development time.

Depending on the absolute size of the crank shafts 1 up to ca. 3 pieces can simultaneously be produced in one mold. In this example the delivery period for the first cast parts after finishing the design is reduced from about 20 weeks to few days up to about 2 weeks. If modifications of the constructions arise in the course of testing, which is probable, then those modifications can be realized within hours in the CAD system and transposed within a few days into a new cast part whereby the product development periods can be drastically reduced. If the construction is perfect, then a conventional master molding tool is made as before for the pilot production and for the industrial-scale production, but it will no longer be necessary to modify this tool or even discard it after several modifications.

A warm curing mold material, for example molding sand consisting of silica sand coated with phenolic resin is used as molding material 3. The process of curing the molding material 3 in this method is based on a chemical setting process on the resin coating of the silica grain initiated by the laser beam. This process is basically different from the known sinter process in that it consists in a thermically induced irreversible chemical reaction of the binder system. When selectively curing the molding material the solidification is obtained only by curing the resin. The sand which may form about 90 to 95% of the molding material in no way participates in the chemical reaction occurring in the curing process. It is an advantage over the sand melting described in U.S. Pat. No. 4,247,508 that a considerably lower laser power is required and that problems such as shrinkage and warp of the curing material do practically not occur or are strongly reduced. The reactions occurring within the resin material are merely initiated by the laser and brought to an end by the thermal aftertreatment so that the result is a complete curing of the resin. When casting the cast part later on the resin burns off and the intact sand can be removed from the cast part.

As shown in FIG. 8 cavities 20 of the future cast part, the so-called cores of the casting mold 6, may be produced with this method simultaneously with the casting mold 6 itself and integrated therein. The conventional placing of the cores into the shell mold is therefore dropped.

An advantage thereof is the higher accuracy compared with the known method in which molding sand is scraped off when inserting or placing the core or the plurality of cores which causes a reduced fitting accuracy.

Since the production of a plurality of individual cores for a complex overall core is omitted, considerable time is saved when producing prototypes. The manufacture of a sand mold for example for a prototype of an oil pump housing for an automotive vehicle by means of laser sintering requires about 30 hours, whereas about 4 weeks must be envisaged for building a model device and core boxes in the known sand casting method.

Modifications of the method are possible. For example, sand molds in two pieces can be manufactured which are thereafter combined in the same manner as in the conventional method. It is further possible to manufacture complex cores in one piece for already existing lost cores or permanent molds which so far required the decomposition into several single cores and the subsequent assembly to a core package. The unsolidified molding sand may also be removed through holes which are later bored through the sand mold.

A possible molding material is also zirconic sand, olivine sand, chromite sand, chamotte, corundum or carbon sand either in pure form or mixed in any proportion with one or several of the other materials and provided with a corresponding suitable binder. Usually the binder is a warm or hot curing resin binder which may be used as coating on the sand as well as in the form of separate particles mixed with the sand. Examples for suitable resins are, besides of the phenolic resin, furane, urea or amino resins, novolakes or resoles, urea formaldehyde resins, furfur alcohol urea formaldehydes, phenolic modified furane resins, phenolic formaldehyde resins, furfur alcohol phenolic formaldehyde resins, acrylic resins, acrylic modified phenolic resins or polyacrylic resins which each may be liquid, solid, granular or powderous. Also epoxy resins may be used. Epoxy resins are presently used in casting, but are cured by amine gasing. When thermically curing the epoxy resins according to the inventive method, the advantage of immediate curing up to the final strength would be obtained.

A molding material consisting of a metallic or ceramic powder or granulate which is coated by or mixed with one of the above-mentioned casting resins may also be used for manufacturing casting molds or models or even casting dies.

Since different binder materials also have a different absorption capability for electromagnetic radiation, it is an advisable post-treatment to selectively post-cure the casting mold using different,wavelengths adapted to the absorptivity of the respective binder material. Post-curing of the casting molds may be made for example by microwave irradiation in a microwave furnace. However, it is also possible to use, for example, several post-curing methods one after the other or simultaneously, for example UV irradiation, microwave irradiation or heating.

The device for carrying out the method may be any apparatus usable for laser sintering. It is in particular not required to use a container receiving the molding material, but the molding material can be directly layer-wise applied to the carrier.

It is summarized that the claimed invention allows a drastic reduction of the development periods in foundries working with sand casting. At the same time the assortment of those foundries is extended to cast single parts in the lower casting mass region. According to the invention this is achieved in that warm or hot curing molding materials which are commonly used in casting are at selected points and selectively brought to an irreversible chemical curing by means of a laser whereby the molding base substance remains chemically inert and complex cores and molds suitable for casting can be produced without using master molding tools. It must be stated that it is a particular advantage of the invention that all components of the molding material system used have been known and proven in the foundries for a long time. Their behavior in the casting process is known so that no additional risks or difficulties are to be expected in this respect when entering the market.

It shall be referred to several further developments of the invention. It is, of course, also possible to coat or mix particles of other materials than the molding base substances, such as silica sand, zirconic sand, olivine sand, chromite sand, chamotte, corundum, carbon sand, silica material or any other mineral material, pure or mixed in any proportion with one or a plurality of other materials, either granular, granulated or comminuted with the binder system such as phenolic resins, furane resins, urea resins or amino resins, novolakes or resoles, urea formaldehydes resins, furfur alcohol urea formaldehyde resins, phenolic modified furane resins, phenolic formaldehyde resins, furfur alcohol phenolic formaldehyde resins, acrylic modified phenolic resins or any other resin which can be thermally initiated, either liquid, solid, granulated or powdery, and may be modified and/or dissolved, wherein the molding material may be a mixture of particles of the base substance and particles of the binder material, and to cure them by means of a laser as above described. These may also be metal or ceramic particles, whereby the progress over the prior art results from the fact that the chemically inert particles A (FIG. 1 or FIG. 2, resp.) are brought into a composite of particles A and irreversibly cured binder E corresponding to FIG. 7 in an irreversible chemical reaction of the binder system B (by polycondensation) rather than by sintering and/or chemical reaction with participation of particles A themselves. The objects thus produced would be suitable as casting dies in casting applications, but they are not limited thereto.

It is further possible to irradiate the inventive molding base substances as here discussed and mixed or coated with the above-discussed inventive binder systems in a two-dimensional manner by means of a mask rather than in selective manner or in a scanning pattern by means of a laser whereby the same curing mechanism is initiated. Before the irradiation the mask must be prepared by the cross-section of the part to be produced corresponding to the actual elevation coordinate. The energy source should be selected to be suitable with respect to the radiation intensity and wavelength. This embodiment of the invention is particularly suited for job-size manufacture, if the same molding material layer at several building sites existing within the machine is irradiated in succession through the prepared mask before the mask is prepared for the next cross-section.

We claim:

1. A method for manufacturing a three-dimensional lost casting mold including any core for sand casting of a cast part, the method comprising the following steps of:

providing the geometry of said cast part as a digital pattern;

generating from said digital pattern an inverse pattern for the lost casting mold including any core;

providing a layer of a particulate molding material, said molding material comprising a first material and a second material, said first material being chemically inert when irradiated by electromagnetic radiation and said second material being curable by a chemical curing process which is initiated by electromagnetic radiation, scanning said layer by irradiating electromagnetic radiation on places of said layer corresponding to a cross-section of said inverse pattern for the lost casting mold including any core, controlling said irradiation so as to initiate said chemical curing process in said second material, and repeating said layer providing, scanning and controlling steps for subsequent layers of said molding material such that a subsequent layer is connected to the immediately preceding layer by said irradiation to produce the lost casting mold including any core for subsequently casting said cast part.

2. The method of claim 1, wherein said first material compromises silica sand, zirconic sand, olivine sand, chromite sand, chamotte, corundum, carbon sand, silica material or any other mineral material in pure form or mixed in any proportion with one or several of said other materials, said first material being granular, granulated or comminuted.

3. The method of claim 2, wherein said first material consists partly or entirely of previously used material, said material being regenerated or not regenerated and having adhering material which chemically reacts with said second material.

4. The method of claim 1 wherein said first material comprises a metal or ceramic powder.

5. The method of claim 1, wherein said second material comprises phenolic resin, furane resin, urea resin or amino resin, novolakes or resoles, urea formaldehyde resin, furfur alcohol urea formaldehyde resin, phenolic modified furane resin, phenolic formaldehyde resin, furfur alcohol phenolic formaldehyde resin, acrylic modified phenolic resin or any other resin which can be thermally cured either in liquid, solid, granular or powdery form and being modified and/or dissolved.

6. The method of claim 1, wherein said second material comprises epoxy resin, acrylic resin or polyacrylic resin.

7. The method of claim 1, wherein said molding material comprises particles of said first material, said particles being coated with said second material.

8. The method of claims 7, comprising coating said first material by cold coating, warm coating, hot coating or melt coating.

9. The method of claim 7, comprising adding one or more aggregates, accelerators, acids, iron oxide, separating agents, ammonium salts, hexamethylentetramine, hexamine, urea, magnetite, hematite, calcium stearate, glycerine, water or solving agent during said mixing of said first with said second material or during coating said first material with said second material.

10. The method of claim 1, wherein said molding material comprises a mixture of particles of said first material with particles of said second material.

11. The method of claim 1 comprising using a laser beam for irradiating said molding material and deflecting said laser beam to said places corresponding to said cross-section in said layer.

12. The method of claim 1 comprising irradiating said material in two-dimensional manner through a mask which is transparent to said irradiation at said places to be cured of said layer.

13. The method of claim 1 comprising using an electromagnetic radiation having a wavelength in the ultraviolet region.

14. The method of claim 1, comprising using electromagnetic radiation having a wavelength in the infrared region.

15. The method of claim 1, comprising selecting an energy input of said electromagnetic radiation into the molding material to be cured by varying an irradiation period and/or an intensity of said radiation so that said energy input starts said chemical curing process in said second material, whereas said first material does not react.

16. The method of claim 15, comprising observing a color change of said molding material and controlling said chemical curing process in accordance to said color change and readjusting said irradiation period and/or said intensity if necessary.

17. The method of claim 1, comprising carrying out said solidification selectively in an air, oxygen or inert gas atmosphere.

18. The method of claim 1, comprising carrying out said solidification selectively under pressure or reduced pressure.

19. The method of claim 1, comprising producing segments, shells, masks or other parts of molds and cores and combining said segments, shells, masks or other parts with lost cores, casting dies or cores or parts thereof produced with the same or different materials.

20. The method of claim 1, comprising producing a mold and core selectively in one piece or with one or several divisions and, in the latter case, combining said divided mold and core.

21. The method of claim 1 comprising producing several molds and cores simultaneously.

22. The method of claim 1, comprising completing said lost casting mold including any core by additions which are required by casting technology and produced in the same or a different manner from the same or different materials before using said lost casting mold including any core.

23. The method of claim 1, comprising providing said lost casting mold including any core with coating materials before using said lost casting mold including any core.

24. The method of claim 1, comprising thermally aftertreating said lost casting mold including any core for improving their strength and suitability for casting, said thermal aftertreating causing a further curing of said second material.

25. The method of claim 1, said molding material being dry and pourable.

26. A method of producing sand casting molds of warm curing mold material for casting a cast part, wherein molding sand is used as a mold material and a warm curing results from a chemical setting process initiated by electromagnetic radiation, the method comprising the following steps:

generating a computer model of a sand mold from digital information defining the geometry of said cast part;

providing a first layer of said molding sand;

directing electromagnetic radiation onto said first layer and using said computer model to control said directing said electromagnetic radiation onto places of said layer corresponding to said sand casting mold, and repeating said providing and directing steps for subsequent layers of said molding sand, and removing unsolidified molding sand after solidification of all layers of said sand casting mold.

27. The method of claim 26, wherein said molding sand comprises silica sand having a phenolic resin coating.

28. The method of claim 26, comprising producing a casting mold having an integrated core.

29. The method of claim 26, comprising producing said casting mold in one piece.

30. The method of claim 26, comprising producing said casting mold with a runner gate.

31. The method of claim 26, comprising providing openings in said casting mold and removing uncured molding material through said openings after said solidification.

32. The method of claim 31, comprising producing said openings generating said computer model of said casting mold.

33. The method of claim 26, comprising producing a separate core.

34. The method of claim 33, comprising producing a one-piece core for a casting mold.

35. The method of claim 26, comprising using laser radiation as said electromagnetic radiation.

36. The method of claim 35 comprising using radiation of an infrared laser.

37. The method of claim 26, comprising the step of thermally post-curing said casting mold.

38. The method of claim 26, comprising the step of post-curing said casting mold by irradiation with micro waves.

39. The method of claim 26, said molding sand comprising silica sand, zirconic sand, olivine sand, chromite sand, chamotte, corundum or carbon sand or silica material, and warm or hot curing resin binder being added to each of said materials.

40. The method of claim 39, said warm or hot curing resin binder being a resin of the group of furane resins, urea resins or amino resins, urea formaldehyde resins, furfur alcohol urea formaldehyde resins, phenolic modified furane resins, phenolic formaldehyde resins, furfur alcohol phenolic formaldehyde resins, acrylic modified phenolic resins, acrylic resins or polyacrylic resins, each of said resins being either in liquid, solid, granulated or powdery form.

41. The method of claim 39, comprising the step of using an epoxy resin as resin binder.

42. The method of claim 26, comprising the step of inducing a chemical setting process in said resin when solidifying said molding sand, said setting process being started by said laser, wherein said sand does not chemically participate in said setting process.

* * * * *